US008611896B2

(12) United States Patent
Nader et al.

(10) Patent No.: US 8,611,896 B2
(45) Date of Patent: Dec. 17, 2013

(54) NEIGHBOR CELL LIST COMPILATION METHODS AND APPARATUS

(75) Inventors: Ali Nader, Malmö (SE); Tommy Sjögren, Malmö (SE); Lars Sundström, Hjärup (SE)

(73) Assignee: Telefonaktiebolaget L M Ericssson (publ), Stockholm (SE)

( * ) Notice: Subject to any disclaimer, the term of this patent is extended or adjusted under 35 U.S.C. 154(b) by 194 days.

(21) Appl. No.: 12/615,352

(22) Filed: Nov. 10, 2009

(65) Prior Publication Data

US 2010/0136969 A1 Jun. 3, 2010

Related U.S. Application Data

(60) Provisional application No. 61/118,752, filed on Dec. 1, 2008.

(51) Int. Cl.
*H04W 4/00* (2009.01)

(52) U.S. Cl.
USPC ........ 455/434; 455/455; 455/436; 455/432.1; 455/435.1; 455/522

(58) Field of Classification Search
USPC ............ 455/434, 455, 436, 432.1, 435.1, 522
See application file for complete search history.

(56) References Cited

U.S. PATENT DOCUMENTS

| | | | |
|---|---|---|---|
| 6,185,423 B1 * | 2/2001 | Brown et al. | 455/434 |
| 7,013,140 B2 | 3/2006 | Östberg et al. | |
| 2002/0119774 A1 | 8/2002 | Johannesson et al. | |
| 2003/0040311 A1 * | 2/2003 | Choi | 455/434 |
| 2004/0033804 A1 * | 2/2004 | Binzel | 455/437 |
| 2006/0003764 A1 | 1/2006 | Saglam et al. | |
| 2006/0040700 A1 * | 2/2006 | Roberts et al. | 455/525 |
| 2006/0094427 A1 * | 5/2006 | Buckley et al. | 455/434 |

(Continued)

FOREIGN PATENT DOCUMENTS

| | | |
|---|---|---|
| EP | 1786233 A2 | 5/2007 |
| WO | 99/25137 A1 | 5/1999 |
| WO | 2007/027034 A1 | 3/2007 |
| WO | 2008/053314 A2 | 5/2008 |

OTHER PUBLICATIONS

EPO, Intl Search Report, Mar. 9, 2010, for PCT/EP2009/065610.
EPO, Written Opinion, Mar. 9, 2010, for PCT/EP2009/065610.

(Continued)

*Primary Examiner* — Kiet Doan
*Assistant Examiner* — Dung Lam
(74) *Attorney, Agent, or Firm* — Potomac Patent Group PLLC

(57) ABSTRACT

A user equipment (UE) in a communication system can keep track of the cell/frequency deployment of a network operator preferred by the user, and based on the tracked information, the UE can build up its own user-specific Neighbor Cell List. When the UE is roaming, the UE does received-signal measurements according to cells and carrier frequencies identified in the broadcast Neighbor Cell Lists of the roamed-into network, but the UE also does received-signal measurements (with higher priority) according to the user-specific Neighbor Cell List that it has built up. Accordingly, a UE implementing a user-specific Neighbor Cell List analyzes its radio environment based on received signals and stores information about that environment, including user-preference information that prioritizes cells in the radio environment. The UE can then carry out cell search based on the stored environment and user-preference information.

15 Claims, 2 Drawing Sheets

(56) References Cited

U.S. PATENT DOCUMENTS

| | | |
|---|---|---|
| 2006/0099943 A1* | 5/2006 | Koo ............................ 455/432.1 |
| 2006/0119583 A1* | 6/2006 | Potera ........................... 345/171 |
| 2007/0121552 A1 | 5/2007 | Lindoff |
| 2007/0265828 A1* | 11/2007 | Lorraine Scott et al. ......... 704/9 |
| 2008/0031368 A1 | 2/2008 | Lindoff et al. |
| 2008/0070604 A1* | 3/2008 | Castagnet .................... 455/466 |
| 2008/0126077 A1* | 5/2008 | Thorn .............................. 704/8 |
| 2008/0153486 A1 | 6/2008 | Ramkull et al. |
| 2009/0059871 A1 | 3/2009 | Nader et al. |

OTHER PUBLICATIONS

3GPP, TS 23.122, Non-Access-Stratum (NAS) Functions Related to Mobile Station (MS) in Idle Mode (Release 6), V6.5.0, Jun. 2005, Section 4.4.

3GPP, TS 25.304 V6.10.0, UE Procedures in Idle Mode and Procedures for Cell Reselection in Connected Mode (Release 6), Mar. 2008, Sections 4.1, 5.1, 5.2, 5.4.

3GPP, TS 45.008 V6.20.0, Radio Subsystem Link Control (Release 6), Feb. 2008, Section 6.6.

3GPP, TS 44.018 V6.23.0, Radio Resource Control (RRC) Protocol (Release 6), Dec. 2007, Section 3.4.1.2.

3GPP, TS 25.331 V6.19.0, Radio Resource Control (RRC) Protocol Specification (Release 6), Sep. 2008, Sections 8.4.1.6.7 and 8.4.1.9.5.

3GPP, TS 24.008 V6.19.0, Core Network Protocols, Stage 3 (Release 6), Jun. 2008, Section 4.4.1.

EPO, Int'l Prelim Rpt on Patentability in PCT/EP2009/065610, Mar. 14, 2011.

* cited by examiner

FIG. 1
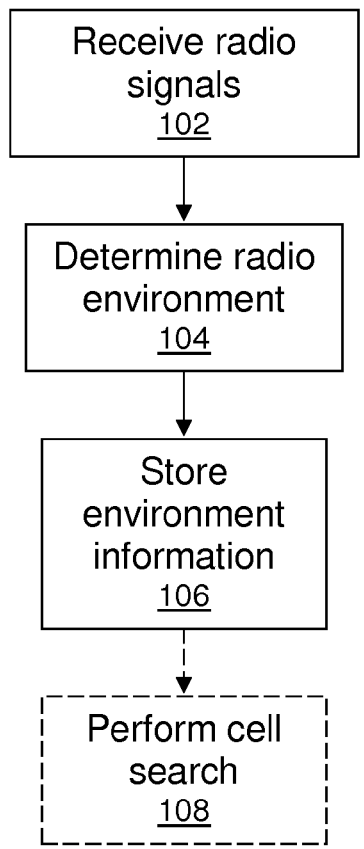
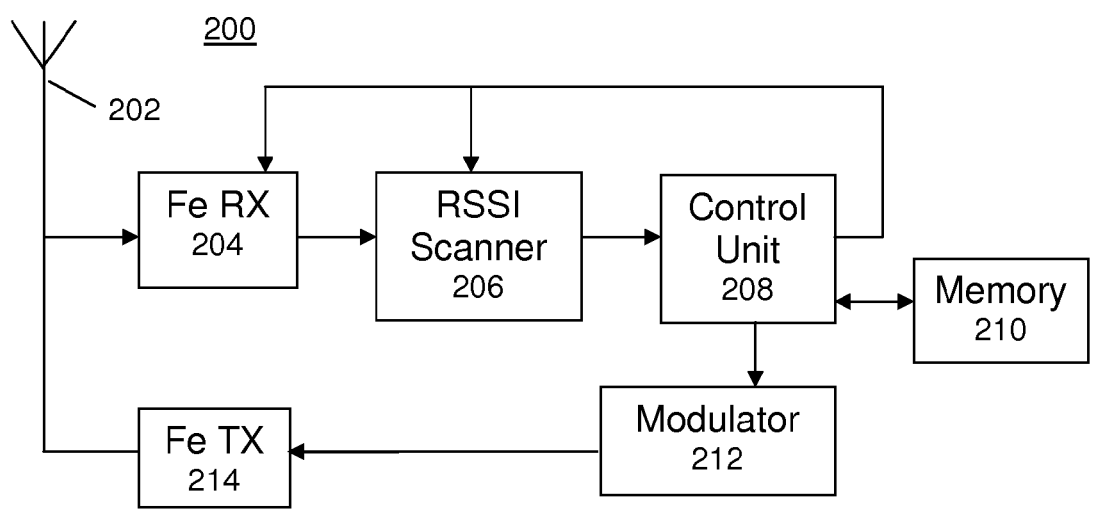
FIG. 2

NEIGHBOR CELL LIST COMPILATION METHODS AND APPARATUS

This application claims the benefit of the filing date of U.S. Provisional Patent Application No. 61/118,752 that was filed on Dec. 1, 2008, and that is incorporated in this application by reference.

TECHNICAL FIELD

This invention relates to electronic communication systems and more particularly to wireless communication systems.

BACKGROUND

From time to time, a user equipment (UE), such as a mobile phone or other remote terminal in a cellular radio communication system, searches for and selects cells and public land mobile networks (PLMNs). Cell and PLMN selection has a number of objectives, which include connecting a UE to the cell(s) and PLMN(s) that will provide the highest quality of service (QoS), enable the UE to consume the least power, generate the least interference, etc.

Wireless communication systems include time-division multiple access (TDMA) systems, such as cellular radio telephone systems that comply with the GSM telecommunication standard and its enhancements, such as general packet radio service (GPRS) and enhanced data rates for GSM evolution (EDGE); code-division multiple access (CDMA) systems, such as cellular radio telephone systems that comply with the IS-95, cdma2000, and wideband CDMA (WCDMA) telecommunication standards; orthogonal frequency division multiple access (OFDMA) systems, such as cellular radio telephone systems that comply with the Long Term Evolution (LTE) standard; and "blended" systems. GSM, WCDMA, LTE, etc. are different radio access technologies (RATs), and the Third Generation Partnership Project (3GPP) promulgates specifications for wireless communication systems that use such technologies.

When a UE performs a PLMN Scan, the UE typically carries out three steps: a received signal strength indication (RSSI) scan, cell search on chosen carrier frequencies, and a read of broadcast PLMN information where the cell search was successful. Cell selection is usually based on measured received signal strength (e.g., signal to interference ratio (SIR) or signal to noise ratio (SNR)) of candidate cells. Fast and efficient cell searches and received signal measurements are important for a UE to get and stay connected to a suitable cell, which can be called a "serving cell", and to be handed over from one serving cell to another. On a regular basis, a UE measures its received signal strength and signal quality of each cell it detects, including the serving cell, to determine whether a change to a new serving cell is needed or not. In general, the new serving cell can use the same carrier frequency as the old serving cell or a different frequency.

For 3GPP-compliant wireless communication systems, the PLMN scan process is specified in, for example, Section 4.4 of 3GPP Technical Specification (TS) 23.122, Non-Access-Stratum (NAS) Functions Related to Mobile Station (MS) in Idle Mode (Release 6), V6.5.0 (June 2005); Section 5.1 of 3GPP TS 25.304 V6.10.0, UE Procedures in Idle Mode and Procedures for Cell Reselection in Connected Mode (Release 6) (March 2008); and Section 6.6 of 3GPP TS 45.008 V6.20.0, Radio Subsystem Link Control (Release 6) (February 2008). PLMN scan is also described in U.S. Patent Application Publications No. US 2002/0119774 A1 by R. Johannesson et al. for "Method for PLMN Selection" and No. US 2008/0153486 A1 by J. Ramkull et al. for "Efficient PLMN Search Order". US 2002/0119774 describes how a UE can receive a list of data associated with networks neighboring the PLMN currently serving the UE from a base station (BS) of the PLMN currently serving the UE, and a new PLMN to serve the UE can be selected based upon the list US 2008/0153486 describes how a UE can shorten the time needed to find a cell, such as a suitable or acceptable cell, by using intelligent search orders.

For 3GPP-compliant wireless communication systems, procedures for selecting and re-selecting cells are defined in, for example, Sections 5.2 and 5.4 of 3GPP TS 25.304. Cell selection and re-selection are also described in U.S. Patent Application Publications No. US 2008/0031368 A1 by Lindoff et al. for "Efficient Cell Selection"; No. US 2009/0059871 A1 by Nader et al. for "Time-to-Trigger Handling Methods and Apparatus"; and No. US 2007/0121552 by B. Lindoff for "Cell Selection in High-Speed Downlink Packet Access Communication Systems".

U.S. Pat. No. 7,013,140 to Östberg et al. describes cell searches that are based on a history list and cell planning knowledge. The history list is used when a PLMN scan is triggered, and frequencies in the history list are objects for cell search. For a WCDMA system, a frequency usually covers a large geographic area. The knowledge of cell planning involves the 5-MHz width of a WCDMA carrier and a rule that a network operator typically tries to fill up a frequency band completely. Carriers (cells) are then assumed to be located with 5-MHz relative distances from the first carrier placed on the lowest frequency of the band.

In many wireless cellular communication systems, each cell broadcasts information about its geographically adjacent cells, or neighbor cells. The information is typically broadcast as a Neighbor Cell List, which includes information needed by a UE to carry out the cell selection procedure on the neighbor cells. UEs typically maintain local copies of the latest-received Neighbor Cell List, and make received-signal measurements on the cells identified in the List. In some cases, a UE reports the results of its measurements to its serving cell, enabling the network to direct the UE to reselect to a neighbor cell, and in other cases, the UE on its own initiative reselects to a neighbor cell based on its measurements.

For 3GPP-compliant wireless communication systems, procedures for use of Neighbor Cell Lists are defined in, for example, Section 3.4.1.2 of 3GPP TS 44.018 V6.23.0, Radio Resource Control (RRC) Protocol (Release 6) (December 2007); and Sections 8.4.1.6.7 and 8.4.1.9.5 of 3GPP TS 25.331 V6.19.0, Radio Resource Control (RRC) Protocol Specification (Release 6) (September 2008).

For 3GPP-compliant wireless communication systems, procedures for network registration are defined in, for example, Section 4.4.1 of 3GPP TS 24.008 V6.19.0, Core Network Protocols, Stage 3 (Release 6) (June 2008); and Sections 4.1 and 5.2.2.1 of the above-cited 3GPP TS 25.304.

A Neighbor Cell List is a tool that a network operator can use to control a UE's movement through the network. For example, an operator can use a Neighbor Cell List to broadcast information about which and how many carrier frequencies the UE shall measure on.

Broadcast Neighbor Cell Lists are typically very operator-specific, which is to say that each network operator simply describes its own cell/frequency deployment in its Neighbor Cell Lists and disregards any user preferences. The typical disregard of user preferences causes problems, particularly in scenarios in which a UE has "roamed" from its "home" network run by its "home operator" into another network run by a "roamed operator". To permit roaming, the roamed operator of the roamed-into network typically has a so-called roaming agreement with the home operator that allocates charges for services, etc.

For example, suppose the UE is in an area in which the home operator's network and the roamed operator's network overlap. The UE can be deemed to have roamed into the roamed operator's network when the UE merely temporarily loses coverage by its home operator's network. "Temporarily" can mean anything from a few seconds to a much longer period, e.g., days while a UE travels abroad. Once in the roamed operator's network, the UE sees only Neighbor Cell Lists that address the roamed operator's cells, and so the UE measures only these cells. It should be appreciated that this can happen despite a very short loss of coverage by the home network and despite the fact that the UE could find its home network if only the UE would search for the correct cells. The UE will not find the home operator's network again unless it is configured to scan for its home network every now and then.

Even if a UE is configured to scan for its home network, for example upon lapse of a suitable timer, the roamed operator may have entered the UE's home PLMN as an equivalent PLMN (EqPLMN). This effectively disables the UE's home PLMN scan timer, and the UE will have to lose coverage of the roamed operator's network before the UE will select a different PLMN, potentially its home PLMN.

Another problem in the example is that both the user and the home operator suffer extra monetary charges imposed by the roamed operator according to the type(s) of service(s) used. That can be particularly irritating for the user and the home operator when the UE is in an area in which the home operator's network and the roamed operator's network overlap, and the UE inappropriately gets and stays connected to the roamed operator's network.

Another problem in the example is that the roamed operator's Neighbor Cell Lists can point at cells and/or carrier frequencies and/or RATs that the UE is not permitted to use. For example, such cells/frequencies/RATs may be used by only the roamed operator's own subscribers. A cell search is a time- and energy-consuming procedure that can take up to 400 ms. As a result, the UE can waste time and electrical energy making vain received signal measurements.

SUMMARY

In accordance with aspects of this invention, there is provided a method in a receiver of using user-preference information for a cell search procedure in a wireless communication system. The method includes receiving in the receiver radio signals transmitted by at least one cell in the wireless communication system; determining information about a radio environment of the receiver by analyzing the received radio signals; and storing the determined information in association with user-preference information in a memory. The user-preference information indicates at least one wireless communication system preferred for a cell search procedure.

In accordance with other aspects, there is provided a computer-readable medium having instructions that, when executed by a computer, cause the computer to carry out a method in a receiver of using user-preference information for a cell search procedure in a wireless communication system. The method includes receiving radio signals transmitted by at least one cell in the wireless communication system; determining information about a radio environment of the receiver by analyzing the received radio signals; and storing the determined information in association with user-preference information in a memory. The user-preference information indicates at least one wireless communication system preferred for a cell search procedure.

In accordance with further aspects, there is provided an apparatus in a receiver for using user-preference information for a cell search procedure in a wireless communication system. The apparatus includes an analyzer configured to analyze received radio signals transmitted by at least one cell in the wireless communication system, and to determine information about a radio environment of the receiver by analyzing the received radio signals; and a memory configured to store the determined information in association with user-preference information, wherein the user-preference information indicates at least one wireless communication system preferred for a cell search procedure.

BRIEF DESCRIPTION OF THE DRAWINGS

The various objects, features, and advantages of this invention will be understood by reading this description in conjunction with the drawings, in which:

FIG. 1 is a flowchart of a method of providing user-preference information for a PLMN or cell search procedure;

FIG. 2 is a block diagram of a portion of a user equipment in a communication system.

DETAILED DESCRIPTION

Figure 3:
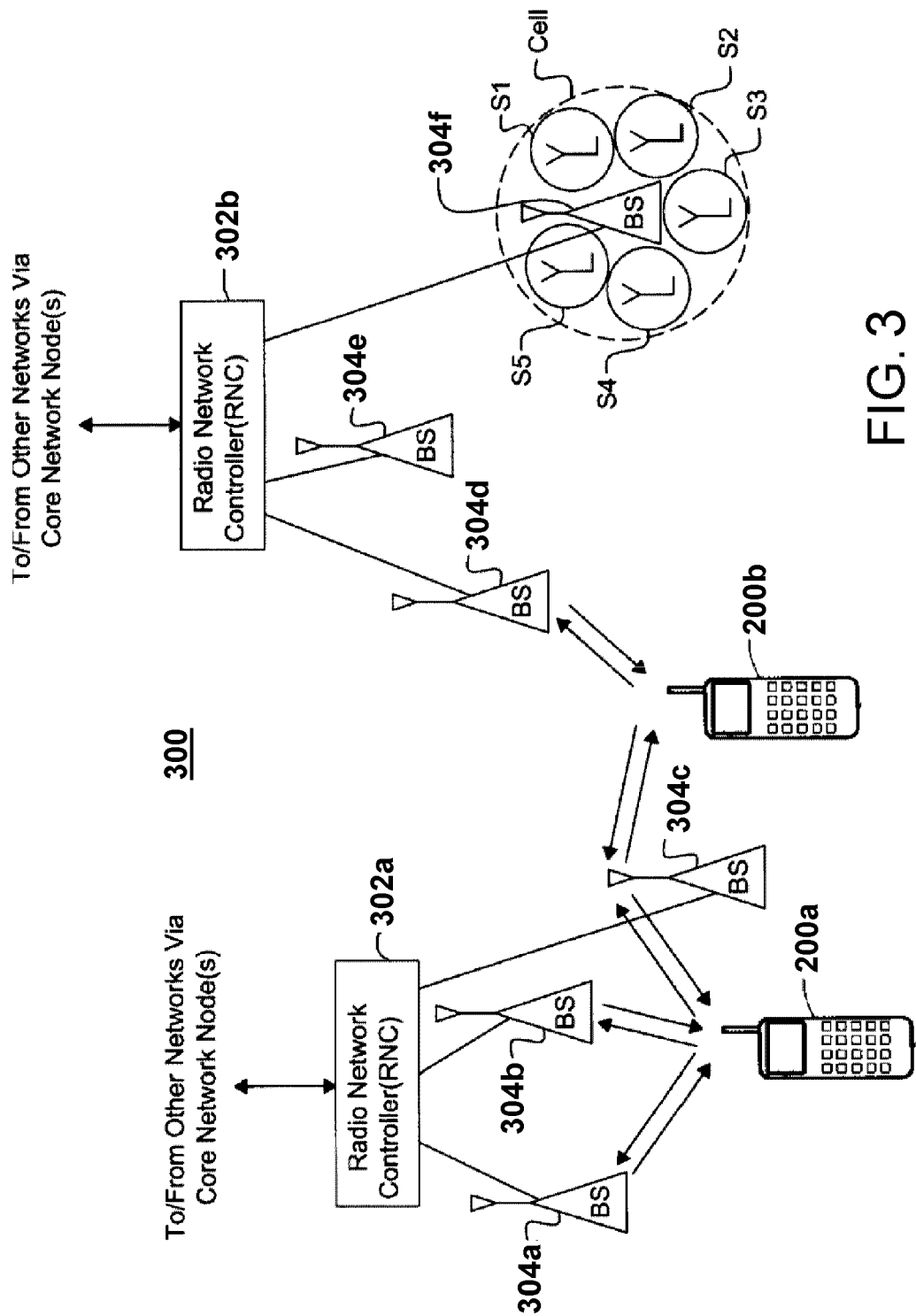
FIG. 3 is a block diagram of a wireless communication system.

This application focuses on WCDMA communication systems for economy of explanation, but it will be understood that the principles described in this application can be implemented in other communication systems.

The inventors have recognized that a UE can keep track of the cell/frequency deployment of a network operator preferred by the user, and based on the tracked information, the UE can build up its own user-specific Neighbor Cell List. When the UE is roaming, the UE does received-signal measurements according to cells and carrier frequencies identified in the broadcast Neighbor Cell Lists of the roamed network, but the UE also does received-signal measurements (with higher priority) according to the user-specific Neighbor Cell List that it has built up. Accordingly, a UE implementing a user-specific Neighbor Cell List analyzes its radio environment based on received signals and stores information about that environment, including user-preference information that prioritizes cells in the radio environment. The UE can then carry out cell search based on the stored environment and user-preference information.

The UE can conveniently analyze and store radio environment information through any of the procedures for PLMN scan, cell selection, reading Neighbor Cell Lists, network registration, etc. that are specified for the particular wireless communication system. In carrying out those procedures, the UE inevitably receives information on the deployment of the local radio environment. The UE analyzes the received information to determine and store the frequency planning pattern used by an operator/PLMN in a geographical area. It is currently believed that the received information that is analyzed by the UE and enables the UE to determine the frequency planning pattern (see the entries in the Extra Info Database table illustrated below) includes at least the PLMN codes, frequencies, and RAT.

If desired, the UE can store information only for operators (PLMNs) that are "interesting" from the UE's point of view, such as operators with low roaming cost, or home operators. The geographical area can be a country or other area that the UE can recognize, for example, by the corresponding Global Positioning System (GPS) coordinates or by the corresponding Mobile Country Code (MCC), which a cell includes in its broadcast PLMN code. The UE can use the frequency planning pattern to determine on which cells/frequencies/RATs it is most likely to find a specific operator in a certain geographic area. Also, the UE advantageously stores information how detected PLMNs are related in terms of equivalent PLMN or neighbor relations.

The UE advantageously stores the information in a database pattern that the UE builds up as time passes. The database pattern can be called an "Extra Info Database", or a user-specific Neighbor Cell List, an example of which is as follows.

Extra Info Database

| Geographical Area | PLMN | RAT | Freq planning pattern | Priority |
|---|---|---|---|---|
| Sweden (Northern Part) | 240 XX | WCDMA | A, B | |
| Sweden (Southern Part) | 240 XX | WCDMA | B, C | |
| Papua, New Guinea | 310 YY | LTE | C | |

Entries in the Extra Info Database include indications of geographical areas, PLMNs, and associated RATs and frequencies, which can be provided in conventional text. In the example given above, the indications of geographical area can separately identify countries and areas within countries, and the indications of PLMN are MCCs 240 and 310 (according to the geographical area) and the Mobile Network Code (MNC), which are shown as XX and YY in the example as they correspond to the network operator that should be used in that country. The indications of RAT in the example are self-explanatory. The frequency planning pattern entries can be conveniently short indicators, e.g., A, B, C, etc., of patterns of the frequencies (e.g., absolute radio frequency channel numbers (ARFCNs), UTRA absolute radio frequency channel numbers (UARFCNs), or enhanced ARFCNs (EARFCNs)) that are known in advance and so can be prestored in the UE or can be fetched by the UE from a database in the network. As another alternative, the UE can gradually build up and store the pattern(s) as it moves around in a geographical area and among areas. Any suitable format can be used for the indications of PLMN priority. The priority indications can be used to prioritize PLMNs that are more "interesting" from the UE's point of view, e.g., to prioritize PLMNs having the lowest roaming cost. The priority indications can also be used to let a network operator decide what priority different roaming partners can have. It will be understood that the contents of the Extra Info Database shown above are also exemplary. It will be understood that before the UE has had time to build up an Extra Info Database, the UE uses the Neighbor Cell List broadcast by the network according to the applicable specifications for the communication system.

While the UE camps on a PLMN, the UE uses the information stored in its Extra Info Database in determining whether one or more PLMNs with a higher priority might be available. If so, the UE extends the normal Neighbor Cell List that it received from the operator/cell it is currently camped on with entries stored in the Extra Info Database for the extra cells/frequencies/RATs determined by the UE itself. The UE can advantageously use the stored information as it carries out the measurement procedures for cell reselection specified for the wireless communication system on both the cells identified in the Neighbor Cell List and the extra cell(s)/frequencie(s)/RAT(s) identified by entries in the Extra Info Database. In that way, the Extra Info Database is a user-specific Neighbor Cell List.

When the UE's received-signal measurements on its user-specific Neighbor Cell List fulfill certain criteria, which can be prestored in the UE or communicated to the UE by the home operator and then stored and can be different for different PLMNs, the UE reselects to the desired PLMN. It is currently believed that suitable criteria include passing a desired received signal code power (RSCP) threshold level; lapse of a timer, such as a time period for the reselection cell to fulfill other criteria before reselection; etc.

FIG. 1 is a flow chart of a method in a UE or other receiver of providing user-preference information for a PLMN or cell search procedure in a wireless communication system as described above. In step 102, the UE receives radio signals transmitted by at least one cell in the wireless communication system, e.g., by conducting an RSSI scan, and in step 104, information about the UE's radio environment is determined by analyzing received radio signals. The determined information includes suitable indicators of geographical area, PLMN, RAT, and frequency plan, as well as indicators of user preference.

In step 106, the determined information and associated user-preference information is stored in a memory. As described above, the user-preference information indicates at least one cell preferred for a cell search procedure. The method can be extended by using the stored information either alone or together with a received Neighbor Cell List during a predetermined cell search procedure for the wireless communication system (step 108).

The UE might not find it suitable to perform measurements on all cells/frequencies/RATs in the normal Neighbor Cell List and/or the user-specific Neighbor Cell List, for example, due to battery-power consumption, hardware or other limitations. To handle that, the UE can prioritize by PLMN, giving more time to measurements on cells/frequencies/RATs that according to the Extra Info Database belong to the highest priority PLMN.

Among the several advantages provided by methods and apparatus in accordance with this invention is that the most suitable operator's network can be chosen for a given user. Compared to conventional implementations, a mobile UE uses its battery energy and time on measuring "proper" cells/frequencies/RATs, which for a network operator and a user, can save a significant amount of money. Since each WCDMA cell search attempt takes approximately one second, the savings in wasted time and energy can be large. The operator and the user can circumvent the conventional cell reselection rules implemented in mobile devices and avoid paying unnecessary roaming fees to other operators. Yet another advantage of building up a user-specific Neighbor Cell List as described above is that otherwise conventional cell reselection procedures specified for the wireless communication system are still used. Compiling a user-specific Neighbor Cell List and using conventional cell reselection procedures enables smooth UE transitions from a roamed operator's network back to the home operator's network.

FIG. 2 is a block diagram of a portion of a UE 200 that is suitable for implementing the methods described above. For simplicity, only some parts of the UE 200 are shown in the figure. It will also be understood that the UE can be implemented by other arrangements and combinations of the functional blocks shown in FIG. 2.

Signals are received through an antenna 202 and downconverted to base-band signals by a front-end receiver (Fe RX) 204. On a regular basis for all detected cells, the RSCP is estimated and the RSSI is computed by an RSSI scanner 206 that operates under the control of a control unit 208. An RSCP can be estimated by, for example, de-spreading the base-band signal from a detected cell with the scrambling code (and common pilot channel (CPICH) channelization code) corresponding to the cell. Methods of computing RSSIs are well known in the art. In suitable communication systems, for example, the RSSI can be estimated by computing the variance of the received signal over a given time period, such as one time slot (e.g., 0.67 ms).

The control unit 208 uses the RSSI scan information in identifying radio carriers and analyzing the UE's radio environment according to the methods described above. The control unit 208 stores information determined in the analysis in a suitable memory 210, and retrieves stored information as needed. Based on the results of such searches and other information, the control unit 208 controls the operation of the Fe RX 204 and scanner 206 to carry out PLMN scans, cell searches, and other procedures specified for the wireless communication system as described above. Thus, the FE RX 204, scanner 206, and control unit 208 form an analyzer configured to analyze received radio signals transmitted by at least one cell in the wireless communication system and to determine information about a radio environment of the receiver by analyzing the received radio signals. It will be appreciated that the UE 200 also typically includes a modulator 212 and a front-end transmitter (Fe TX) 214 and other devices for sending information to the network and using received information.

The control unit 208 and other blocks of the UE 200 can be implemented by one or more suitably programmed electronic processors, collections of logic gates, etc. that processes information stored in one or more memories 210. The stored information can include program instructions and data that enable the control unit to implement the methods described above. It will be appreciated that the control unit typically includes timers, etc. that facilitate its operations.

FIG. 3 is a diagram of a PLMN 300, which may be, for example, a WCDMA communication system. Radio network controllers (RNCs) 302a, 302b control various radio network functions, including for example radio access bearer setup, diversity handover, etc., for communicating with UEs. More generally, each RNC directs calls from a UE, such as a mobile phone, via one or more appropriate RBSs, which communicate with UEs 200a, 200b through downlink (i.e., base-to-mobile, or forward) and uplink (i.e., mobile-to-base, or reverse) channels. RNC 302a is shown coupled to RBSs 304a, 304b, 304c, and RNC 302b is shown coupled to RBSs 304d, 304e, 304f. The RBSs are coupled to their corresponding RNCs by dedicated telephone lines, optical fiber links, microwave links, etc. Each RBS, which is called a NodeB in 3GPP parlance, serves a geographical area that can be divided into one or more cell(s), which FIG. 3 depicts as non-overlapping, but that is not necessary. RBS 304f is shown as having five antenna sectors S1-S5, all or some of which can be said to make up the cell of the RBS 304f. Both RNCs 302a, 302b are typically connected with external networks such as the PSTN, the Internet, etc. through one or more core network nodes, such as a mobile services switching center and/or a general packet radio service node (not shown). The artisan will understand that the components and arrangement depicted in FIG. 3 are examples and should not be construed as limiting the components and arrangement of an actual communication system.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a receiver of using user-preference information for a cell search procedure in a wireless communication system, comprising:
   receiving in the receiver radio signals transmitted by at least one cell in the wireless communication system providing acceptable service;
   determining information about a radio environment of the receiver by analyzing the received radio signals transmitted only by at least one cell in the wireless communication system of a preferred network operator; and storing the determined information in association with user-preference information in a memory, wherein stored information causes a cell search procedure conducted when the receiver is not connected to the wireless communication system of the preferred network operator to prefer to search for a cell in the wireless communication system of the preferred network operator;

storing the determined information in association with user-preference information comprises generating a user-specific Neighbor Cell List; and the user-specific Neighbor Cell List is gradually built up as time passes; and when the receiver is not connected to the wireless communication system of the preferred network operator, preferentially conducting a cell search procedure for a cell in the wireless communication system of the preferred network operator.

2. The method of claim 1, further comprising using the stored information during a predetermined cell search procedure for a wireless cellular communication system.

3. The method of claim 1, wherein the user-specific Neighbor Cell List includes frequency planning pattern entries of patterns of cell carrier frequencies.

4. The method of claim 1, wherein determining information about a radio environment comprises carrying out a procedure for at least one of public land mobile network (PLMN) scan, cell selection, and network registration specified for the wireless communication system.

5. The method of claim 4, wherein analyzing the received radio signals determines at least a PLMN code, carrier frequencies of cells, and radio access technologies of cells in the wireless communication system.

6. The method of claim 4, wherein determined information is stored only for at least one PLMN of a home operator.

7. A non-transitory computer-readable medium having instructions that, when executed by a computer, cause the computer to carry out a method in a receiver of using user-preference information for a cell search procedure in a wireless communication system, wherein the method comprises:

receiving radio signals transmitted by at least one cell in the wireless communication system providing acceptable service;

determining information about a radio environment of the receiver by analyzing the received radio signals transmitted only by at least one cell in the wireless communication system of a preferred network operator; and storing the determined information in association with user-preference information in a memory, wherein stored information causes a cell search procedure conducted when the receiver is not connected to the wireless communication system of the preferred network operator to prefer to search for a cell in the wireless communication system of the preferred network operator;

storing the determined information in association with user-preference information comprises generating a user-specific Neighbor Cell List; and the user-specific Neighbor Cell List is gradually built up as time passes; and when the receiver is not connected to the wireless communication system of the preferred network operator, preferentially conducting a cell search procedure for a cell in the wireless communication system of the preferred network operator.

8. The non-transitory medium of claim 7, wherein the method further comprises using the stored information during a predetermined cell search procedure for a wireless cellular communication system.

9. The non-transitory medium of claim 7, wherein the user-specific Neighbor Cell List includes frequency planning pattern entries of patterns of cell carrier frequencies.

10. The non-transitory medium of claim 7, wherein determining information about a radio environment comprises carrying out a procedure for at least one of public land mobile network (PLMN) scan, cell selection, and network registration specified for the wireless communication system.

11. The non-transitory medium of claim 10, wherein analyzing the received radio signals determines at least a PLMN code, carrier frequencies of cells, and radio access technologies of cells in the wireless communication system.

12. The non-transitory medium of claim 10, wherein determined information is stored only for at least one PLMN of a home operator.

13. An apparatus in a receiver for using user preference information for a cell search procedure in a wireless communication system, comprising:

an analyzer configured to analyze received radio signals transmitted by at least one cell in the wireless communication system providing acceptable service; and to determine information about a radio environment of the receiver by analyzing the received radio signals transmitted only by at least one cell in the wireless communication system of a preferred network operator;

wherein the analyzer is configured to generate a user-specific Neighbor Cell List as determined information stored in association with user-preference information; and the user-specific Neighbor Cell List is gradually built up as time passes; and a memory configured to store the determined information in association with user-preference information, wherein stored information causes a cell search procedure conducted when the receiver is not connected to the wireless communication system of the preferred network operator to prefer to search for a cell in the wireless communication system of the preferred network operator; and enables the receiver, when the receiver is not connected to the wireless communication system of the preferred network operator, preferentially to conduct a cell search procedure for a cell in the wireless communication system of the preferred network operator.

14. The apparatus of claim 13, wherein the user-specific Neighbor Cell List includes frequency planning pattern entries of patterns of cell carrier frequencies.

15. The apparatus of claim 13, wherein the analyzer is configured to determine information about a radio environment by carrying out a procedure for at least one of public land mobile network (PLMN) scan, cell selection, and network registration specified for the wireless communication system.

* * * * *

UNITED STATES PATENT AND TRADEMARK OFFICE
CERTIFICATE OF CORRECTION

| | | |
|---|---|---|
| PATENT NO. | : 8,611,896 B2 | Page 1 of 1 |
| APPLICATION NO. | : 12/615352 | |
| DATED | : December 17, 2013 | |
| INVENTOR(S) | : Nader et al. | |

It is certified that error appears in the above-identified patent and that said Letters Patent is hereby corrected as shown below:

On the Title Page, Item (73), under "Assignee", in Column 1, Line 1, delete "Ericssson" and insert -- Ericsson --, therefor.

Signed and Sealed this
Nineteenth Day of August, 2014

Michelle K. Lee
*Deputy Director of the United States Patent and Trademark Office*